United States Patent [19]

Barrett et al.

[11] 4,203,458
[45] May 20, 1980

[54] NEGATIVE GRAVITY SWIVEL DEVICE

[75] Inventors: Alfred J. Barrett, Littleton; Samuel M. Warner, Aurora, both of Colo.

[73] Assignee: The United States of America as represented by the Secretary of the Air Force, Washington, D.C.

[21] Appl. No.: 939,753

[22] Filed: Sep. 5, 1978

[51] Int. Cl.² ............................................. F16K 17/36
[52] U.S. Cl. ................................... 137/38; 137/625.4; 244/135 R
[58] Field of Search ................. 137/38, 39, 625.4; 244/80, 135 R

[56] References Cited

U.S. PATENT DOCUMENTS

| | | | |
|---|---|---|---|
| 2,860,648 | 11/1958 | Harrison | 137/38 |
| 2,934,077 | 4/1960 | Whiting | 137/38 |
| 3,317,250 | 5/1967 | Martin | 137 38 X/ |

Primary Examiner—Robert G. Nilson
Attorney, Agent, or Firm—Joseph E. Rusz; James S. Shannon

[57] ABSTRACT

An apparatus for withdrawing fluid from the fuel tank of an aircraft or missile. A structure of coaxial cylinders with one slidable member responding to transient variations in the direction of the gravitation ("g") force acting on the reservoir by reversing the fluid withdrawal location. When the "g" force is positive, the fluid is drawn from the reservoir below. If the "g" force becomes negative, the slidable cylinder translates to align a different set of passage ports within the structure, changing the location of the fluid draw to one within the fluid.

4 Claims, 2 Drawing Figures

NEGATIVE GRAVITY SWIVEL DEVICE

RIGHTS OF THE GOVERNMENT

The invention described herein may be manufactured and used by or for the Government of the United States for all governmental purposes without the payment of any royalty.

BACKGROUND OF THE INVENTION (1) Field of the Invention

This invention relates to devices for maintaining continuity of flow when the fluid being withdrawn is taken from a reservoir while everything is being subjected to an aircraft or missile type transient negative "g" environment.

(2) Description of the Prior Art

Conventional systems for gathering fluid from fuel tanks, when the tanks are to be subjected to varying "g" environments, incorporate combinations of flexible inlet lines having weights or floats attached to their fluid gathering ends, bellows, springs and check valves. Though capable of negative "g" operation, the resultant apparatus is often complex, costly and prone to high rates of failure.

SUMMARY OF THE INVENTION

Coaxial cylinders form a structure by which fluid may be drawn from a reservoir beneath, during positive "g" operation, or a reservoir above the withdrawal apparatus during negative "g" operation. During normal, positive "g" operation a slidably mounted concentric cylinder aligns its ports with those of a hollow inner cylinder, permitting fluid to be drawn up the hollow cylinder and through the aligned ports. When the "g" force reverses, the slidable cylinder moves to align a different set of ports while closing the previous. The newly aligned ports allow fluid to be drawn only from a passage extending upward into the fluid reservoir created during negative "g" operation.

DESCRIPTION OF THE PREFERRED EMBODIMENT

Figure 1:
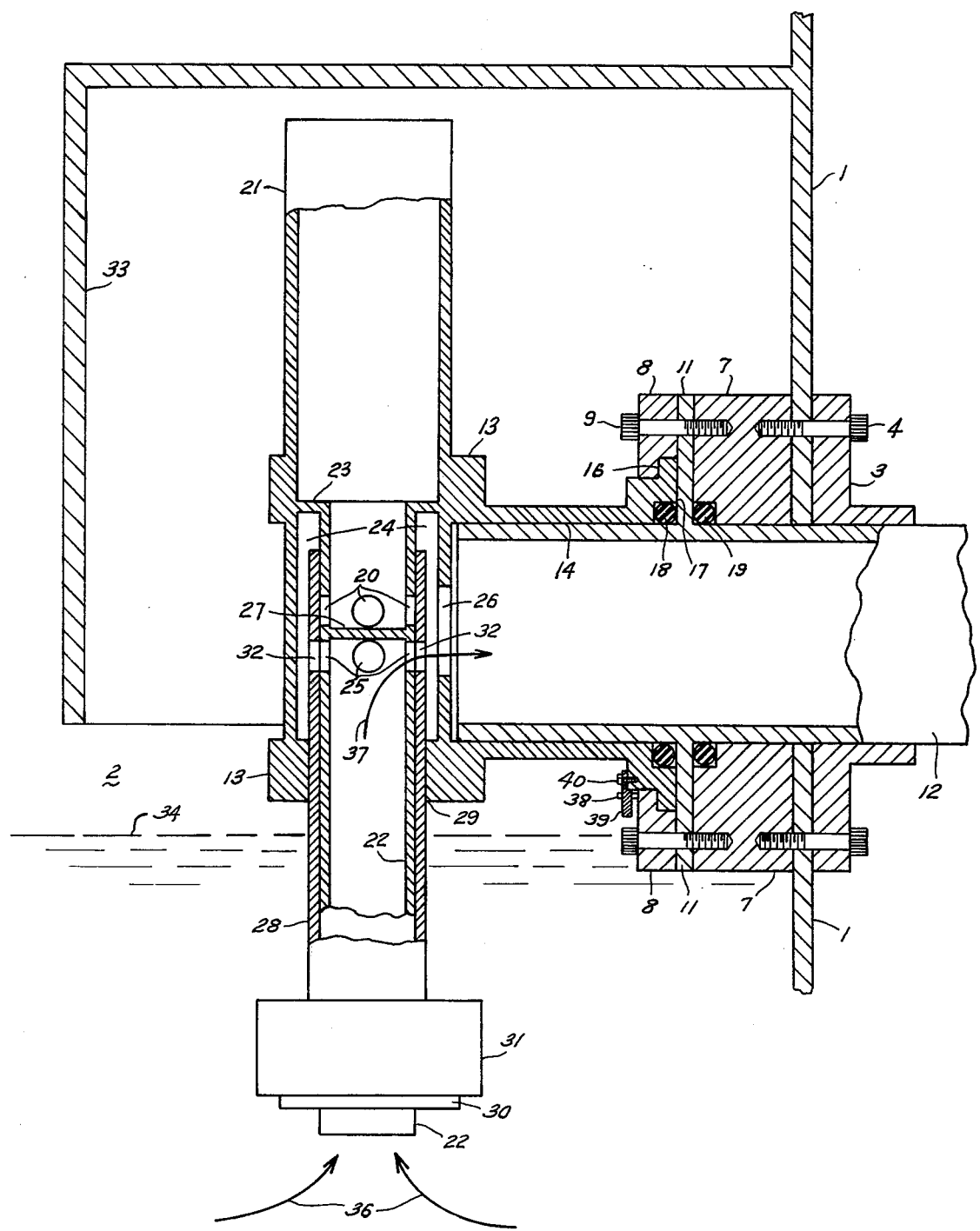
FIG. 1 is a cross sectional view of the embodying apparatus in a normal "g" environment, where the fluid is substantially at the bottom of the reservoir.

Referring now to FIG. 1, the embodiment is shown in an orientation typifying normal, positive "g" operation. The fluid withdrawal apparatus is rigidly mounted to side wall 1 of fluid reservoir 2 by outer mounting plate 3 and bolts 4. The bolts engage threads in backing plate 7. In a similar fashion retainer 8 is attached to the opposite face of backing plate 7 with bolts 9, which extend through retainer 8 and flange 11 of fluid outlet line 12 to engage threaded holes in backing plate 7.

Swivel hub assembly 13 is rotatably mounted on the end of fluid outlet line 12 and axially restrained by retainer 8. Dimensional separation between adjacent elements at bearing surfaces 14, 16 and 17 permits hub assembly 13 to rotate freely about the axis of fluid outlet line 12.

Seals to prevent excessive amounts of fluid leakage appear as O-rings 18 and 19. O-ring 18 allows hub assembly 13 to swivel while preventing fluid or gas leakage along the surfaces mating the hub assembly with outlet line 12. Leakage between flange 11 of outlet line 12 and backing plate 7 is inhibited by O-ring 19. Since sealing the mating surfaces of backing plate 7, reservoir side wall 1, and outer mounting plate 3 would utilize structural techniques and materials that are conventional and form no important part of the invention, they have been omitted from the drawings and description.

Upper fixed post 21 and lower fixed post 22 are substantially hollow, coaxial cylinder segments of swivel hub assembly 13. Lower fixed post 22 extends half way into upper fixed post 21, at which point it meets the inner surface of upper post 21 by upper end flange 23. Thereby, tubular cavity 24 is formed between the posts. Upper fixed post 21 has an opening 26 between cavity 24 and the open end of fluid outlet line 12. Lower fixed post 22 contains multiple passages between its interior and cavity 24, in the form of upper and lower port sets, 20 and 25 respectively, separated by fixed baffle plate 27.

Movable outer cylinder 28 is slidably mounted over lower fixed post 22 with sufficient dimensional clearance, between fixed post 22 and swivel hub assembly 13 at interface 29, to allow it free sliding travel. Weight 31 is attached to the lower end of movable outer cylinder 28, and rests on flange 30 of lower fixed post 22 when movable outer cylinder 28 is translated to the lower end of its travel.

A set of ports 32 is also present in the body of movable outer cylinder 28. Their location is such that they align with upper ports 20 when movable outer cylinder 28 is positioned at the upper end of its travel, resting against upper end flange 23. When the "g" forces translate outer cylinder 28 to the lower end of its travel, the same set of ports 32 are brought into alignment with lower ports 25 in lower fixed post 22.

Hood 33 forms a negative "g" reservoir, trapping and retaining sufficient fluid to supply the pump during the transient negative "g" period of operation.

Figure 2:
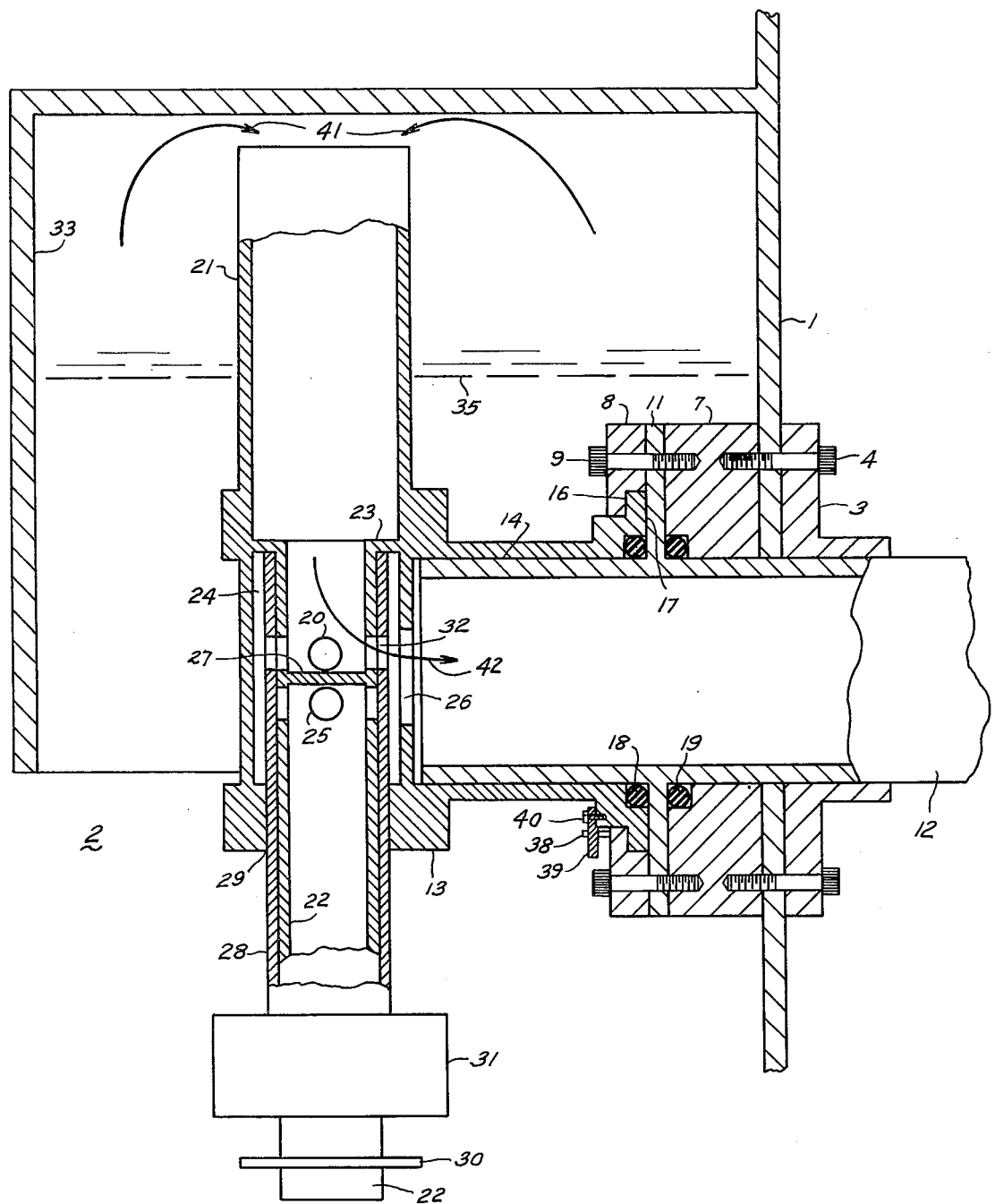
FIG. 2 shows the apparatus appearing in FIG. 1 reorientated for negative "g" operation.

FIGS. 1 and 2 also depict the two operational states of the embodying apparatus. The orientation appearing in FIG. 1 is representative of normal or positive "g" operation. Movable outer cylinder 28 is pulled downward by weight 31 until it rests against flange 30, aligning ports 32 with ports 25. Fluid at a level 34 is then drawn by a pump, attached to the far end of outlet line 12, into the hollow center of lower fixed post 22, through ports 25 and 32, collected in cavity 24, and thereafter enters fluid outlet line 12 through opening 26 in upper fixed post 21. The described path is shown by arrows 36 and 37.

Minor fluctuations in the fluid level caused by small "g" force variations are compensated for by the swivel action of hub assembly 13 about outlet line 12. In one form, it is contemplated that the magnitude of this swivel would be mechanically limited by two stop pins 38 in retainer 8 spaced radially about the swivel axis at angles of 30 degrees either side of the depicted vertical. Finger 39 mounted on hub assembly 13 by screw 40 would make contact with stop pins 38 to limit swivel within the allowed 60 degree arc.

The introduction of a negative "g" environment causes the apparatus described above to assume the orientation shown in FIG. 2. A quantity of fluid to a level 35 becomes trapped in reservoir hood 33. Movable outer cylinder 28 and weight 31 attached thereto translate upward until the upper end of cylinder 28 rests against flange 23, causing ports 20 and 32 to become aligned. Fluid confined within hood 33 is then drawn into outlet line 12 by passing through upper fixed post 21, ports 20 and 32, and opening 26, as depicted by arrows 41 and 42 in FIG. 2.

We claim:

1. A fluid gathering apparatus operable in either a positive or negative "g" environment, comprising:
   (a) an outer cylinder;
   (b) an inner cylinder substantially coaxial with the outer cylinder, attached at one end to the inner surface of the outer cylinder by a flange therebetween;
   (c) an upper port in the wall of the inner cylinder;
   (d) a lower port in the wall of the inner cylinder;
   (e) a baffle plate inside the inner cylinder separating the segments of the cylinder containing the upper and lower ports;
   (f) a coaxial intermediate cylinder slidably mounted between the inner and outer cylinders to form a seal therebetween;
   (g) a port in the intermediate cylinder, located so that it aligns with the lower port of the inner cylinder when the slidable intermediate cylinder is in a first position, and aligns itself with the upper port of the inner cylinder when the slidable intermediate cylinder is in a second position;
   (h) an opening through the walls of the outer cylinder communicating with the port in the intermediate cylinder, irrespective of whether the intermediate cylinder is in its first or second positions;
   (i) a means for limiting the downward travel of the intermediate cylinder to a location no further than the first position; and
   (j) a means for limiting the upward travel of the intermediate cylinder to a location no further than the second position.

2. The apparatus recited in claim 1, wherein the outer cylinder is mounted on a swivel hub, and the opening in the wall of the outer cylinder communicates with a passage through the hub.

3. The apparatus recited in claim 2, wherein a means for limiting hub rotation prevents swivel beyond a prescribed arc.

4. The apparatus recited in claims 1, 2 or 3, wherein a hood is attached over the apparatus to create a fluid reservoir during negative "g" operation from which fluid may be drawn into a passage communicating with the upper port in the wall of the inner cylinder.

* * * * *